(12) United States Patent
Howard et al.

(10) Patent No.: US 7,429,820 B2
(45) Date of Patent: Sep. 30, 2008

(54) FIELD EMISSION DISPLAY WITH ELECTRON TRAJECTORY FIELD SHAPING

(75) Inventors: Emmett M. Howard, Gilbert, AZ (US); Kenneth A. Dean, Phoenix, AZ (US); Michael R. Johnson, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 298 days.

(21) Appl. No.: 11/007,574

(22) Filed: Dec. 7, 2004

(65) Prior Publication Data

US 2006/0119248 A1    Jun. 8, 2006

(51) Int. Cl.
*H01J 1/62*    (2006.01)
*H01J 63/04*    (2006.01)

(52) U.S. Cl. ................ 313/495; 313/309; 313/310; 313/336; 313/346 R; 313/351

(58) Field of Classification Search ............ 313/495, 313/309–311, 336, 346 R, 361, 351
See application file for complete search history.

(56) References Cited

U.S. PATENT DOCUMENTS

| | | | |
|---|---|---|---|
| 5,473,218 A | | 12/1995 | Moyer |
| 5,696,385 A | * | 12/1997 | Song et al. ............ 257/10 |
| 5,726,524 A | | 3/1998 | Debe |
| 5,760,535 A | * | 6/1998 | Moyer et al. ............ 313/309 |
| 5,804,909 A | * | 9/1998 | Nilsson et al. .......... 313/309 |
| 5,821,132 A | | 10/1998 | Song et al. |
| 6,137,213 A | | 10/2000 | Moyer et al. |
| 6,204,597 B1 | | 3/2001 | Xie et al. |
| 6,424,083 B1 | * | 7/2002 | Tam et al. .............. 313/336 |
| 6,461,211 B1 | * | 10/2002 | Raina et al. ............ 445/24 |
| 6,626,720 B1 | * | 9/2003 | Howard et al. .......... 445/24 |
| 6,646,282 B1 | * | 11/2003 | Chen .................... 257/10 |
| 6,902,458 B2 | * | 6/2005 | Chen et al. ............ 445/50 |
| 7,030,550 B2 | * | 4/2006 | Ide et al. ............... 313/497 |
| 7,070,472 B2 | * | 7/2006 | Dean et al. ............ 445/24 |
| 2003/0184357 A1 | | 10/2003 | Dijon et al. |

OTHER PUBLICATIONS

Choi et al., "A Field-Emission Display with a Self-Focus Cathode Electrode," Applied Physics Letters, vol. 82, No. 20, May 19, 2003, pp. 3565-3567.

* cited by examiner

*Primary Examiner*—Karabi Guharay
*Assistant Examiner*—Kevin Quarterman

(57) ABSTRACT

An apparatus for focusing electrons being emitted from a field emission device comprises a cathode metal layer (20,44, 52) formed over a first portion of a substrate (12,41,51) to partially define a sidewall (23) for a trench (25) in a second portion of the substrate. A ballast layer (22,46,53) is formed over the second portion, the cathode metal layer (20,44,52), and the sidewall (23). A first dielectric layer (24,47,54) is formed over the ballast layer (22,46,53) in the first portion and a gate extraction metal layer (26,48,55) is formed thereover. At least one emitter (30) is formed above the substrate and in the trench (25) having the sidewall (23) defined by the first dielectric layer (24,47,54) and the cathode metal layer (20,44,52). The ballast layer (22,46,53) extends along the sidewall and conductively contacts the cathode metal layer and the at least one emitter and provides a force that counteracts the sidewise pull of the gate extraction metal layer (26, 48,55).

35 Claims, 2 Drawing Sheets

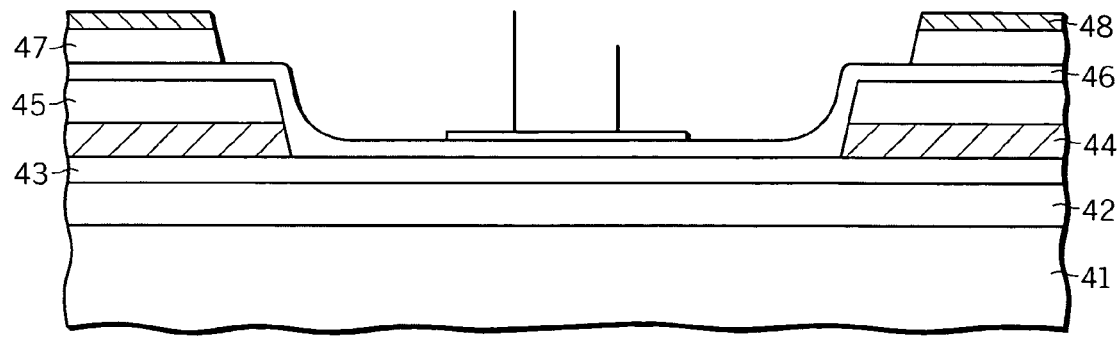
FIG. 4
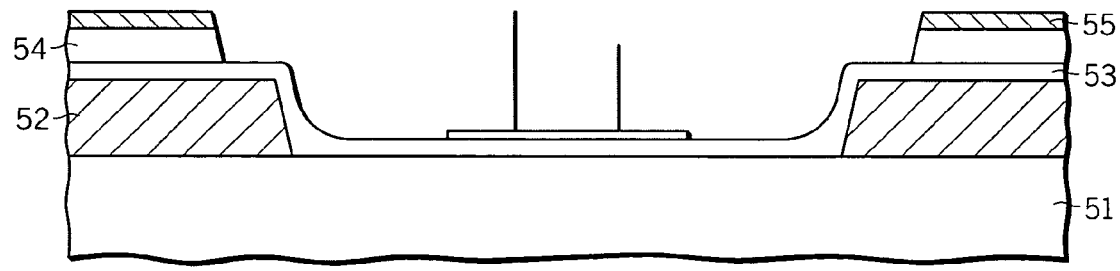
FIG. 5
FIG. 6
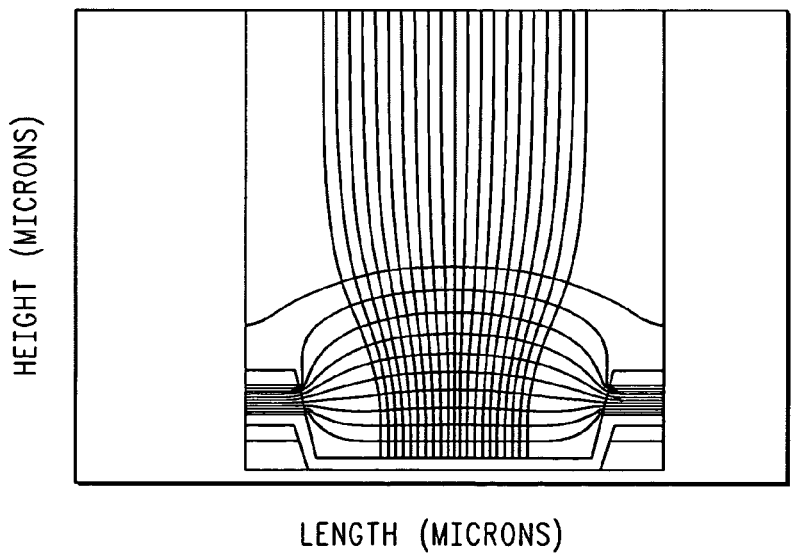

FIELD EMISSION DISPLAY WITH ELECTRON TRAJECTORY FIELD SHAPING

FIELD OF THE INVENTION

The present invention generally relates to field emission displays and more particularly to a field emission display structure that focuses the electrons from the emitter.

BACKGROUND OF THE INVENTION

Field emission devices that generate electron beams from electron emitters such as carbon nanotubes at an anode plate are well known in the art. Each of the electron beams are received at a spot on the anode plate and define a corresponding spot size. The separation distance between the cathode plate and the anode plate determine, in part, the spot size. It is known in the art to control the spot size by using focusing structures to collimate the electron beams.

To achieve adequate display brightness, the anode should be maintained at a high voltage relative to the cathode. Consequently, the anode plate and cathode plate should be spaced far enough apart that nanotubes due not emit electrons from the anode field alone, and the spacers that separate the anode and cathode plates do not break down. This separation distance that is sufficient to prevent unwanted electrical events can result in an undesirably large spot size. As the voltage on the cathode plate generates the electrons which are attracted by a gate electrode from the emitter toward the anode plate, the gate electrode voltage tends to cause the beam to diverge. Thus, focusing structures are frequently employed in field emission devices.

However, prior art focusing structures often employ dielectric layers to support a focusing electrode and to separate the focusing electrode from the other electrodes, such as gate extraction electrodes, of the field emission device. Such prior art focusing structures suffer from disadvantages. For example, the capacitance between the focusing structures and the gate extraction electrodes increases the power requirements of the device. Many focusing structures add additional layers and processing steps to reduce the beam spot size, and this significantly increases fabrication cost and reduces yield. Processing geometries are reduced for many methods, thus reducing the available emitter area, increasing the sensitivity to defects, and increasing processing and equipment costs associated with decrease in feature sizes. For example, a typical focusing scheme incorporates a separate perforated sheet placed between the anode and cathode. The extra sheet adds costs, the precision alignment step reduces yield, and the device requires a double set of spacers, which is extremely complex and costly due to difficulty and low yield.

Prior art focusing structures also reduce the size of the region that can incorporate electron emitters, thereby reducing the overall device current. Prior art focusing structures have also been placed too close to the emitting material, thereby screening the emitter material at the edge of the emitter material region entirely from the gate field. While this reduces the beam size, it also reduces the overall current by orders of magnitude. Prior art focusing structures which place focusing electrodes in proximity to the electron emitters with a distance less than the average height of the emitters risk having the emitters stick to the focusing structure via van der Waals forces, thereby rendering the emitters less useful. Many prior art focusing concepts do not describe a method for implementation and typically require significantly more patterning layers than are economically viable. Prior art focusing structures often do not address the importance of the relationship of the focusing structure to the height of the emitting features. They are typically proposed for electron focusing and fail to account for the re-orientation of the actual emitting nanostructures in the electric field.

Accordingly, it is desirable to provide a field emission device structure that focuses the electron beam from the emitter area away from the gate extraction field without significantly increasing the device cost, thereby providing for a small spot size required for high resolution displays. Such a device would require no new patterning steps, no increased complexity, and would not require more complicated spacer technology. It is desirable for the structure to orient the emitter structures more perpendicular to the anode, thereby reducing the initial lateral velocity. It would also be advantageous to create a structure which increases the focusing function for regions with the highest emission current, since these are regions that would see the largest absolute intensity away from the beam center. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for focusing electrons being emitted from a field emission device. The apparatus comprises a substrate having first and second portions, and a cathode metal layer formed over the substrate in the first portion to partially define a sidewall for a trench in the second portion. A ballast layer is formed over the substrate in the second portion, the cathode metal layer, and the sidewall. A first dielectric layer is formed over the ballast layer in the first portion. A gate extraction metal layer is formed over the first dielectric layer. At least one emitter comprising a high aspect ratio conductive material is formed above the substrate and in the trench having a sidewall defined by the first dielectric layer and the cathode metal layer. The ballast layer extends along the sidewall and conductively contacts the cathode metal layer and the at least one emitter. An anode is positioned to receive electrons from the at least one emitter. The ballast layer provides a force that counteracts the sidewise pull of the gate extraction metal layer.

BRIEF DESCRIPTION OF THE DRAWINGS

The present invention will hereinafter be described in conjunction with the following drawing figures, wherein like numerals denote like elements.

FIG. 4 is a cross section of the structure of a second embodiment.

FIG. 5 is a cross section of the structure of a third embodiment.

FIG. 6 is a graph representing the results of an FEA simulation of the embodiment as shown in FIG. 3, illustrating electric potential lines and electric field lines.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
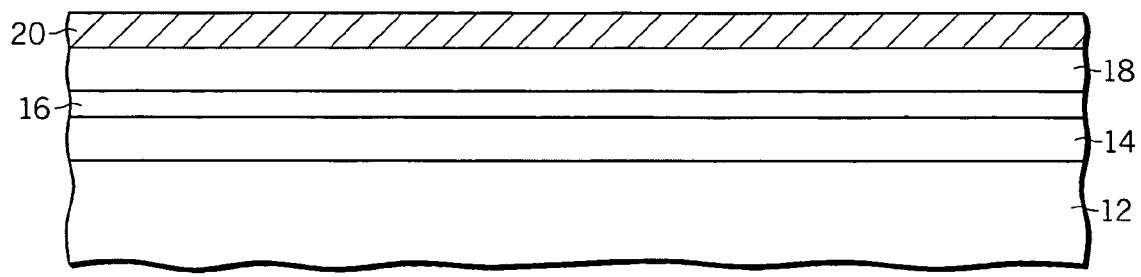
FIGS. 1-3 are cross sections of the structure of a first embodiment during successive periods of fabrication.
Figure 2:
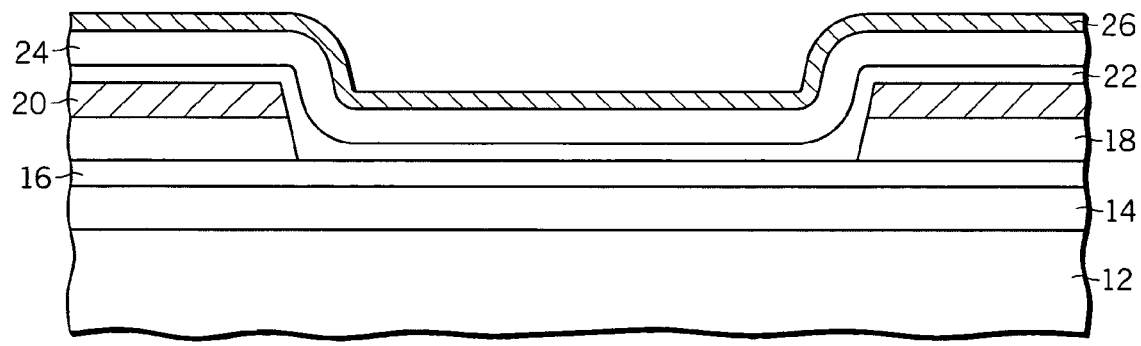
Figure 3:
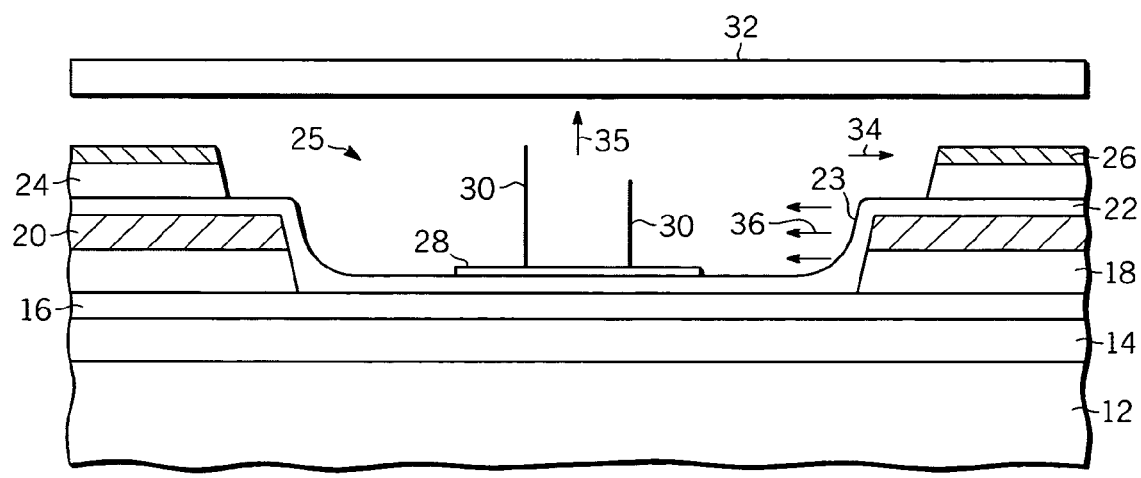

Referring to FIGS. 1-3, the field emission device 10 according to a first embodiment of the present invention includes a dielectric layer 14 deposited on the substrate 12. The substrate 12, for example, comprises glass, silicon, or ceramic. The dielectric layer 14, for example, comprises silicon oxide and would preferably be approximately 1 micron thick. A hard mask 16 of diamond-like carbon or nitride of approximately 0.05-0.5 microns is deposited on the dielectric layer 14 and is used for a self-limiting etch stop to aid in fabrication of a trench structure. Another dielectric layer 18 of silicon oxide and approximately 0.1-2.0 microns thick is deposited on the hard mask 16. A metal layer 20 of molybdenum or copper, for example, and of sufficient thickness to limit the voltage drop over the length of the cathode metal, approximately 0.2-2 microns thick, is deposited on the dielectric layer 18.

Referring to FIG. 2, a photo etch is performed on the metal 20 and then on the dielectric 18 in a manner well known to those skilled in the art. The etch of these two layers is limited by the etch stop layer 16 of diamond like carbon, nitride or similar material, offering a selectivity to the metal 20 and dielectric 18. A ballast layer 22 comprising, for example, Carbon, Silicon Carbon, Silicon Carbide, Tantalum Silicon Nitride, Tantalum Nitride, Chrome Oxi-nitride, Aluminum Nitride, or Silicon doped with one or more of Boron, Phosphorous, Arsenic, Antimony, Tantalum, or Nitrogen is deposited on the hard mask 16, dielectric layer 18, and metal layer 20 creating a side wall 23. The ballast layer 22 is self aligned within the emitter area and coats all exposed surfaces. The ballast resistance selected is such that it limits the current to each emitter (via voltage drop) and as the emitter current increases, the delta cathode voltage increases between emitter pad and trench sidewall 23, reducing the gate voltage electric field influence for electrons leaving the emitters. A dielectric layer 24 of silicon oxide and approximately 1.0 micron thick is deposited on the ballast layer 22. A metal layer 26 of molybdenum or copper, for example, and approximately 0.5 microns thick, is deposited on the dielectric layer 24. The total trench depth created preferably would have a depth to height ratio of 1:1 to 1:20. The emitter length to prevent the anode field from generating emission from the emitters is a ratio of trench depth less gate metal thickness plus the catalyst thickness to the emitter of 2:1 to 1:2.

Referring to FIG. 3, a photo etch is performed on the metal 26, and then on the dielectric layer 24. A pattern (not shown) is performed with the catalyst 28 being subsequently grown or deposited in the trench 25 created by the etching of the dielectric layer 18, metal layer 20, dielectric layer 24, metal layer 26, and ballast layer 22, and including the side wall 23. Alternatively, the catalyst 28 could be grown and then a pattern etch performed. The catalyst 28 preferably comprises nickel, but could comprise any one of a number of other materials including cobalt, iron oxide, and a transition metal or alloys thereof. A carbon nanotube 30 is then grown on the catalyst 28 in a manner known to those skilled in the art. Although only one carbon nanotube 30 is shown, those skilled in the art understand that any number of carbon nanotubes could be grown on the catalyst layer 28. While the preferred emitter is a carbon nanotube, it should be understood that any emitter having a height to radius ratio (high aspect ratio) of greater than 100, for example, would function equally well with the present invention. The distance between the ballast layer 22 on the sidewall 23 and the carbon nanotube 30 is approximately 1-5 microns. Although a trench is preferred, it should also be understood that a well could alternatively be formed. As used herein, trench is considered to include a well. The sidewall 23 height should be greater than 0.5 μm to provide sufficient field to straighten, align, and focus emitters and electrons.

When voltages are applied to the metal layer 20 (cathode), the metal layer 26 (gate electrode), and the anode 32, voltage is supplied through the ballast layer 22 from the metal layer 20 to the catalyst 28 and nanotube 30. Typical voltages on the metal layer 20, metal layer 26, and anode 32 are 0.0-60.0 volts, 0-100.0 volts, and 1,000-10,000 volts, respectively. Electrons are extracted from the nanotube 30 by the local electric field which is dominated by the field generated by the metal layer 26 (gate electrode) and directed to the anode 32 as indicated by arrow 35. The field generated by metal layer 26, in addition to extracting electrons in a beam directed toward the anode 32, also exerts a lateral force (arrow 34) toward the metal layer 26, resulting in divergence of the electron beam from the preferred direct path to the anode and creating a larger beam spot on the anode 32. However, the structure of the present invention, reduces the lateral force exerted on the electrons by the gate electrode field by modifying the electric potential profile and thereby modifying the electric field profile. The relatively zero potential of the cathode field minimizes the lateral influence off the gate extraction filed on the emitted electrons.

This focusing (represented by the arrows 36), or directing, of the electrons from the carbon nanotube 30 by the ballast layer 22 reduces the spot size on the anode 32. Ballast resistance, from cathode metal to catalyst metal, between $1 \times 10^6$ and $1 \times 10^{10}$ ohms is preferred. Electrons emitted from the carbon nanotube 30 closest to the gate electric field have a much lower lateral momentum due to the low potential of the trench sidewall 23 pinned to the cathode potential. Further, the ballast layer 22 in concert with the emission current from the nanotubes 30 increases the potential difference between the emitter pad and the cathode metal 20 (rises above ground relative to cathode metal) with the effect of reducing the spot size at higher emission currents. As a result, those nanotubes 30, which statistically emit with higher current, experience a greater beam divergence reduction than nanotubes with lower emission current. This is important because nanotubes 30 which emit with more current produce a larger beam size on the anode, fur a given intensity detection threshold (even tough the full width at half maximum of the beam full spatial distribution on the anode may be the same), and consequently, they benefit from additional divergence reduction. A collateral benefit of the improved divergence, especially in the near-emitter region is reduced leakage current which would result from excessively diverging electrons intercepting the sidewall and/or gate. Device 10 efficiency is increased by reducing the number of stray electrons impacting the area outside the phosphor subpixel region (i.e., adjacent phosphor regions, the black area surrounding the spot, and spacers (not shown) separating the anode 32 and device 10).

In this first embodiment, a dielectric layer 18 under the ballast layer 22 controls the length of the lateral ballast to the defined cathode 20 to catalyst pad 28. The focusing effect will be enhanced by a minimal amount by the voltage drop caused by the resistance in the trench and the length which is the sidewall 23 height. When the cathode metal 20 is over the dielectric 18, the device operates as described above. An added benefit of cathode metal 20 over ballast layer 22 is the trench depth can be used to control the ballast resistance value. The ballast resistance, R, is determined by the relation $R=\rho*((L_1+L_2)/A)$, where $\rho$ is the resistivity of the ballast material, $L_1$ is the trench depth, $L_2$ is the lateral distance from a pad edge to the nearest sidewall, and A is cross-sectional area for current flow from the cathode to the catalyst pad through the ballast layer. In other embodiments, ballast resistance is determined by $R=\rho*((L_2)/A)$. Changing the depth of the trench or the slope of the trench sidewall 23 will change the ballast resistance without a change in material resistivity, or cathode 20 to catalyst pad 28 spacing. In both cases the available emitter area (catalyst pad 28) is not reduced by adding other features or layers. The proposed device utilizes existing layers in a manner to simplify fabrication, minimize cost, and implement novel methods of electron trajectory control. There are several possible ways to configure the order and thicknesses of the layers in the first set of layers to achieve the desired sidewall potential. The apparatus reduces the beam size both by creating a more advantageous electrical potential profile, thereby reducing the divergence of the beam of emitted electrons; and by creating in the near-emitter pad region an electric field profile which is aligned more closely to perpendicular to the anode plane. It has been demonstrated that nanotubes will align to a local electric field by a mechanism whereby the electric field induces dipole moments in the nanotube, the electric field in turn exerts torques on these dipole moments, tending to align the nanotube in the field. By orienting the nanotubes more perpendicular to the anode, the emitted electrons have a reduced initial lateral velocity.

In a second embodiment shown in HG. 4, the first set of layers is ordered with cathode metal 44 on the bottom, a dielectric layer 45 in the middle, and the ballast layer 46 on top. A typical fabrication sequence would involve providing a substrate 41 with a baffler layers 42 deposited thereover (for example SiO2 or SiN), depositing a hard mask 43. depositing a cathode metal layer 44, depositing a dielectric layer 45, depositing a photoresist, patterning and developing the photoresist, etching the dielectric layer 45 and then the cathode metal layer 44. The ballast layer 46 is deposited as the top layer, thereby covering the sidewall, and a dielectric layer 47 and a gate layer 48 are fonned thereon. It is not patterned in the vicinity of the trench. The ballast sidewall height is desired to be at most 2× the emitter height, less the catalyst thickness. Emitters greater than 1.5× the total trench depth risk contacting the gate prior to biasing and becoming attached by Van der Wall's forces. The catalyst pad distance from the trench sidewall can abate the problem to some extent but lateral gate field strength is compromised at large distances. One advantage of this embodiment is that it provides more isolation between the gate and cathode electrodes and reduces capacitance.

In a third embodiment, shown in FIG. 5, the first set of layers is ordered with a thick cathode metal 52 on the bottom, and the ballast layer 53 on top. A dielectric layer is not used. A typical fabrication sequence would involve providing a substrate 51 with barrier layers on it of, for example, SiO2 or SiN, depositing a thick cathode metal layer 52, depositing a photoresist, patterning and developing the photoresist, etching the cathode metal layer 52. The ballast is deposited as the top layer, thereby covering the sidewall, and a dielectric layer 54 and a gate extraction layer 55 are formed thereon. The ballast sidewall height is desired to be at most 2× the emitter height, less the catalyst thickness.

This invention, in addition to focusing the electrons, also aligns the nanotubes perpendicular to the electric field lines. The presence of the sidewall layer 23 at near the cathode 20 potential directs the electric field lines to be more parallel to the substrate 12. Consequently, the sidewall 23 electrode layer has the effect of orienting the nanotubes 30 more perpendicular to the anode 32 and cathode plates 20, and the nanotubes 30 thereby direct the initially emitted electrons in a direction towards the anode 32, with reduced initial lateral velocity towards the gate 26. The feature is also very important in creating a small beam size on the anode 32.

One added benefit of the invention is that the gate electrode 26 is positioned higher relative to the nanotube 30 height than without the added sidewall height. This reduces the influence of the anode 32 electric field on the nanotube 30. This is important because high anode fields can initiate field emission without extraction from the gate, leading to display pixels that are always in the 'on' state. Some displays are operated with an offset voltage on the gate. The combination of the offset voltage and the anode field can also be sufficient to initiate field emission without extraction from the gate, leading to display pixels that are always in the 'on' state. This invention can reduce the influence of the anode 32 electrode. In some prior art cases, attempts to focus the beam result in significantly higher gate extraction voltage requirements. This is particularly noticeable when the electric field is substantially higher at the edge of the nanotube-containing area than in the middle of the nanotube containing area. In the case of this invention, the sidewall electrode layer 23 has the effect of reducing the field at the edge of the nanotube-containing region by less than 20% for a given gate voltage, but the field in the middle of the nanotube containing region is nominally equal to or higher than the field in the case without the sidewall electrode layer. As a result, electrons are emitted from a larger region of the pad, so the extracted current from the pad is only minimally changed from the case where there is no sidewall electrode layer. In contrast, in some prior art configurations, the current is reduced by 12 orders of magnitude. Often prior art cites a large tradeoff between emission current and reduction in the beam size. In this invention, there is very little tradeoff if any.

An important point of this invention which is lacking in prior art is that the reduction of the beam size on the anode is accomplished without increasing the number of patterning steps, changing the method for inserting spacers in the display, adding new materials, adding complex focusing layers, adding additional electrodes, adding additional inputs and outputs, or modifying any other important parameter. The invention maintains the integrity of the entire display system and does not violate design rules for the other parts. It does not substantially alter the gate extraction voltage. The invention does not require a significant change to the pattern alignments.

Referencing FIG. 6, the graph represents the results of an FEA simulation of the exemplary embodiment described in the preceding text and as shown in FIG. 3, illustrating electric potential lines and electric field lines. The plane of FIG. 6 represents a cross-section through the length of a single emitter trench such that the x-axis is perpendicular to both the length of the trench and a line normal to the planes of the cathode and anode (this line is the z-axis) and such that the z-axis is perpendicular to both the length of the trench and the previously defined x-axis. The current invention provides a substantial improvement over previously known art, including, but not limited to, the following specific advantages:

a. More uniform electric field magnitude in the near-emitter region as evidenced by more uniform spacing of the electric potential lines.

b. Electric field vectors aligned more closely to the normal coincident with symmetry axis of the emitter area.

c. Increased influence of the gate-moderated electric field relative to the anode field. This has direct implications for the requirement that the device not emit electrons when the gate is not biased, i.e., the influence of the anode field is reduced to a point at which diode emission is negligible.

d. Extraction field (for the electric field in the proximity of the emitter, the component of that field normal to the anode) is reduced by no more than 20% which compares favorably with modeled prior art which exhibited extraction field losses of 50%-80%.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A field emission device comprising:
   a substrate having first and second portions;
   a cathode metal layer over the first portion to partially define a sidewall for a trench over the second portion;
   a ballast layer over the second portion, the cathode metal layer, and the sidewall;
   a first dielectric layer over the ballast layer over the first portion;
   a gate extraction metal layer over the first dielectric layer;
   at least one emitter comprising a high aspect ratio conductive material over the ballast layer in the second portion, the distance from the sidewall to the emitter being greater than the emitter height, wherein the high aspect ratio comprises a length to radius ratio of greater than 100; and
   an anode positioned to receive electrons from the at least one emitter.

2. The field emission device of claim 1 further comprising a second dielectric layer between the substrate and the cathode metal layer.

3. The field emission device of claim 2 further comprising a hard mask layer between the substrate and the second dielectric layer.

4. The field emission device of claim 1 further comprising a second dielectric layer between the cathode metal layer and the ballast layer.

5. The field emission device of claim 4 further comprising a hard mask layer between the substrate and the cathode metal layer.

6. The field emission device of claim 1 wherein an electric field associated with the presence of a potential on the sidewall orients the at least one emitter more perpendicular to the substrate.

7. The field emission device of claim 1 wherein the emitter is a carbon nanotube.

8. The field emission device of claim 7 further comprising a catalyst above the substrate, the carbon nanotube being grown thereon.

9. The field emission device of claim 1 wherein the emitter has a height to radius ratio greater than 100.

10. The field emission device of claim 1 wherein the emitter has a length of between 0.5 and 1.5 times the height from the catalyst pad to the gate.

11. The field emission device of claim 1 wherein the ballast layer comprises one of Carbon, Silicon Carbon, Silicon Carbide, Tantalum Silicon Nitride, Tantalum Nitride, Chrome Oxi-nitride, Aluminum Nitride, or Silicon doped with one or more of Boron, Phosphorous, Arsenic, Antimony, Tantalum, or Nitrogen.

12. The field emission device of claim 1 wherein the ballast layer comprises a thickness of between 0.1 and 2.0 microns.

13. The field emission device of claim 2 wherein the second dielectric layer comprises a thickness of between 0.5 and 5.0 microns.

14. The field emission device of claim 1 wherein the at least one emitter is positioned in the trench at a depth substantially at or below the top of the gate extraction metal layer.

15. A field emission device comprising:
   a substrate having first and second portions;
   a hard mask over the first and second portions;
   a first dielectric layer over the hard mask over the first portion;
   a cathode metal layer over the first dielectric layer, wherein the first dielectric layer and the cathode metal layer partially define a sidewall for a trench over the second portion;
   a ballast layer over the substrate in the second portion, the cathode metal layer, and the sidewall;
   a second dielectric layer over the ballast layer over the first portion;
   a gate extraction metal layer over the second dielectric layer;
   at least one emitter comprising a high aspect ratio conductive material over the ballast layer over the second portion, the distance from the sidewall to the emitter being greater than the emitter height, wherein the high aspect ratio comprises a length to radius ratio of greater than 100; and
   an anode positioned to receive electrons from the at least one emitter.

16. The field emission device of claim 15 wherein the emitter is a carbon nanotube.

17. The field emission device of claim 16 wherein an electric field associated with the presence of a potential on the sidewall orients the nanotube more perpendicular to the substrate.

18. The field emission device of claim 16 further comprising a catalyst formed over the second portion, the carbon nanotube being grown thereon.

19. The field emission device of claim 15 wherein the emitter has a height to radius ratio greater than 100.

20. The field emission device of claim 15 wherein the emitter has a length of between 0.5 and 1.5 times the height from the catalyst pad to the gate.

21. The field emission device of claim 15 wherein the ballast layer comprises one of Carbon, Silicon Carbon, Silicon Carbide, Tantalum Silicon Nitride, Tantalum Nitride, Chrome Oxi-nitride, Aluminum Nitride, or Silicon doped with one or more of Boron, Phosphorous, Arsenic, Antimony, Tantalum, or Nitrogen.

22. The field emission device of claim 15 wherein the ballast layer comprises a thickness of between 0.1 and 2.0 microns.

23. The field emission device of claim 15 wherein the first dielectric layer comprises a thickness of between 0.5 and 5.0 microns.

24. The field emission device of claim 15 wherein the at least one emitter is positioned in the trench at a depth substantially at or below the top of the gate extraction metal layer.

25. A field emission device comprising:
   a substrate having first and second portions;
   a hard mask over the first and second portions;

a cathode metal layer over the hard mask over the first portion;

a first dielectric layer over the cathode metal layer, wherein the first dielectric layer and the cathode metal layer partially define a sidewall for a trench in the second portion;

a ballast layer over the substrate in the second portion, the first dielectric layer, and the sidewall;

a second dielectric layer over the ballast layer over the first portion;

a gate extraction metal layer over the second dielectric layer;

at least one emitter comprising a high aspect ratio conductive material over the ballast layer in the second portion, the distance from the sidewall to the emitter being greater than the emitter height, wherein the high aspect ratio comprises a length to radius ratio of greater than 100; and an anode positioned to receive electrons from the at least one emitter.

26. The field emission device of claim 25 wherein the emitter is a carbon nanotube.

27. The field emission device of claim 26 wherein an electric field associated with the presence of a potential on the sidewall orients the nanotube more perpendicular to the substrate.

28. The field emission device of claim 26 further comprising a catalyst over the second portion, the carbon nanotube being grown thereon.

29. The field emission device of claim 25 wherein the emitter has a height to radius ratio greater than 100.

30. The field emission device of claim 25 wherein the emitter has a length of between 0.5 and 1.5 times the height from the catalyst pad to the gate.

31. The field emission device of claim 25 wherein the ballast layer comprises one of Carbon, Silicon Carbon, Silicon Carbide, Tantalum Silicon Nitride, Tantalum Nitride, Chrome Oxi-nitride, Aluminum Nitride, or Silicon doped with one or more of Boron, Phosphorous, Arsenic, Antimony, Tantalum, or Nitrogen.

32. The field emission device of claim 25 wherein the ballast layer comprises a thickness of between 0.1 and 2.0 microns.

33. The field emission device of claim 25 wherein the first dielectric layer comprises a thickness of between 0.5 and 5.0 microns.

34. The field emission device of claim 25 wherein the at least one emitter is positioned in the trench at a depth substantially at or below the top of the gate extraction metal layer.

35. A field emission device comprising:

a first material defining a trench having a sidewall and a bottom;

a ballast layer on the sidewall of the trench, the ballast layer adapted to receive a potential; and at least one emitter comprising a high aspect ratio conductive material positioned in the trench and coupled to the ballast layer, wherein the presence of a potential on the ballast layer on the sidewall and the electric field associated with that potential exerts a force that tends to orient the at least one emitter parallel to the sidewall, wherein the high aspect ratio comprises a length to radius ratio of greater than 100.

* * * * *

UNITED STATES PATENT AND TRADEMARK OFFICE
CERTIFICATE OF CORRECTION

PATENT NO. : 7,429,820 B2  
APPLICATION NO. : 11/007574  
DATED : September 30, 2008  
INVENTOR(S) : Emmett M. Howard et al.

Page 1 of 1

It is certified that error appears in the above-identified patent and that said Letters Patent is hereby corrected as shown below:

1. In Column 4, Line 43, delete "fur" and insert -- for --, therefor.

2. In Column 4, Line 44, delete "tough" and insert -- though --, therefor.

3. In Column 5, Line 25, delete "embodiment shown in HG." and insert -- embodiment, shown in FIG. --, therefor.

4. In Column 5, Line 29, delete "baffler" and insert -- barrier --, therefor.

5. In Column 5, Line 30, delete "SiO2" and insert -- $SiO_2$ --, therefor.

6. In Column 5, Line 30, delete "43." and insert -- 43, --, therefor.

7. In Column 5, Line 36, delete "fonned" and insert -- formed --, therefor.

8. In Column 5, Line 41, delete "Wall's" and insert -- Waal's --, therefor.

9. In Column 5, Line 51, delete "SiO2" and insert -- $SiO_2$ --, therefor.

Signed and Sealed this

Eleventh Day of August, 2009

David J. Kappos  
*Director of the United States Patent and Trademark Office*